3,097,069
PYROLYTIC PRODUCTION OF HYPERPURE
SILICON
Konrad Reuschel, Pretzfeld, Germany, assignor to Siemens-Schuckertwerke Aktiengesellschaft, Berlin-Siemensstadt, Germany, a corporation of Germany
Filed June 9, 1961, Ser. No. 115,990
Claims priority, application Germany June 10, 1960
7 Claims. (Cl. 23—223.5)

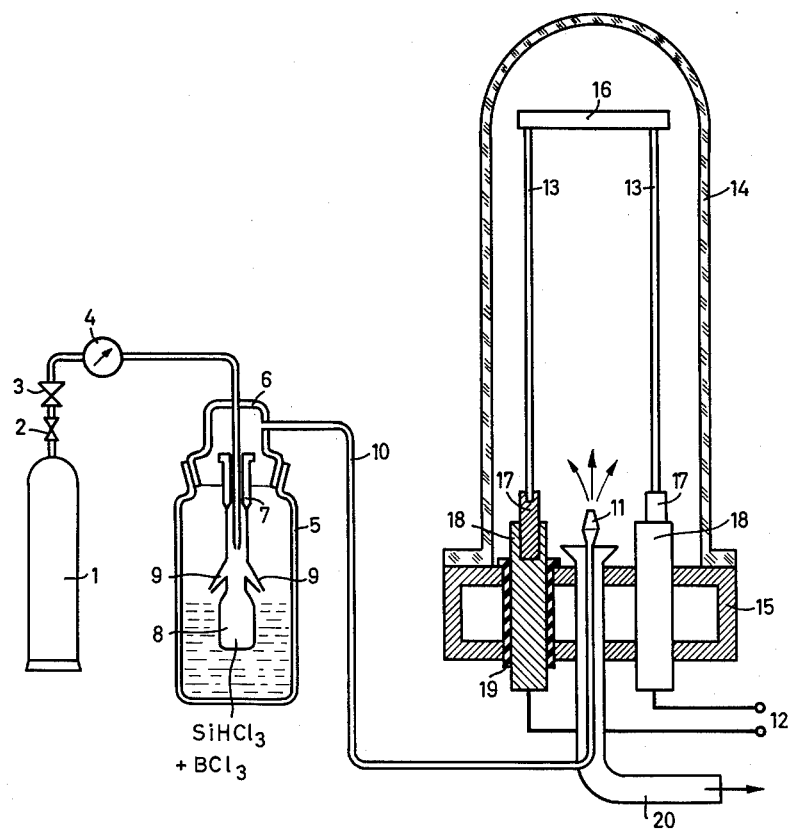

My invention relates to pyrolytic methods of producing hyperpure silicon for electronic purposes. According to such methods, a silicon compound which is liquid at normal room temperature, preferably a silicon halide such as silico-chloroform ($SiHCl_3$) or silicon tetrachloride ($SiCl_4$), is evaporated and the silicon is precipitated in a reaction vessel upon solid, heated carrier bodies by an at least partial reduction of the gaseous compound. A gaseous reduction agent or carrier gas, for example hydrogen, may be mixed with the gaseous silicon compound to promote the pyrolytic reduction. Such a method is described in the co-assigned applications of Schweickert et al., Serial No. 665,086, filed June 11, 1957, now Patent No. 3,011,877 and Bischoff, Serial No. 87,885, filed February 8, 1961. In the known methods, it is a critical prerequisite for the precipitation of extremely pure electronic semiconductor material that neither the heated carrier nor the mixture of gases must carry impurities into the semiconductor material being precipitated. This requirement, as a rule, is satisfactorily met by the hyperpure carrier bodies upn which the material is to be precipitated, as well as by the carrier or reducing gas. Often however, the commercially available halogen compounds used in the above-mentioned pyrolytic methods, particularly silicochloroform ($SiHCl_3$), do not possess the required degree of purity but contain traces of impurities, particularly phosphorus compounds, which enter into the pyrolytic reaction chamber together with the reaction gas mixture. Upon completion of the reaction, the impurities may become embedded in the precipitated semiconductor material in the form of elemental phosphorus. The resulting donor action is undesirable in cases where n-doping or overdoping is detrimental.

It is an object of my invention to improve the pyrolytic production of silicon by greatly reducing or virtually eliminating the precipitation of phosphorus from the reaction gas.

To this end, and in accordance with a feature of my invention, I add to the liquid silicon compound, prior to evaporating the liquid, at least one boron compound from the group of the boron chlorides, boron bromide and boron iodides. Preferably suitable are the tri-halogen compounds, namely boron tri-chloride $BCl_3$, boron tri-bromide $BBr_3$ and boron tri-iodide $BI_3$.

The added boron compounds immediately form addition compounds with the phophorus compounds present in the liquid. During the subsequent evaporation of the liquid silicon-halogen compound in a temperature range of about 18° to 30° C., these addition compounds do not participate in the evaporation but remain in the residue so that they do not enter into the pyrolytic processing chamber. As a result, the precipitatable phosphorus content of the gasified silicon compound is greatly reduced. An improvement in this respect has already been observed with a very slight addition (traces) of boron compound. It has been ascertained particularly that in many cases the quantity of the added boron compounds, with respect to the elemental boron contained therein, can be kept smaller than corresponds to the unity value of the atomic ratio of the elemental boron to the phosphorus contained in the liquid silicon compound, and that such a small boron quantity suffices to reduce the phosphorus content of the evaporated, gaseous silicon compound to such an extent that the doping action of the still remaining phosphorus residue is compensated, at least approximately, by other p-doping impurities present. As a result when, after termination of the pyrolytic precipitation of silicon upon a carrier body, and the resulting product is purified by zone-melting considerably fewer zone-melting passes suffice for obtaining a given high degree of purity in the ultimate product, thus considerably reducing the manufacturing cost.

The invention is contrary to the prevailing view according to which the presence of boron in the pyrolytic production of silicon has been considered detrimental because the distribution coefficient of boron relative to silicon is substantially equal to the value 1 so that boron cannot be removed from silicon by zone-melting and virtually is not eliminated therefrom by vaporization. Despite this seemingly adverse property, however, the addition of boron in form of a chloride, bromide or iodide to the liquid silicon compound has been discovered to be far from detrimental but to afford the above-mentioned reduction in precipitated phosphorus. This is because during the precipitation process under pyrolytic conditions, boron can be built into the precipitated silicon only in negligibly slight quantity since the boron compounds are not being reduced to the same degree as the silico-chloroform or other gaseous silicon-halogen compounds. For this reason, the boron compound may also be added to the liquid silicon compound in a quantity greater than that of the phosphorus compounds contained in the liquid. It is preferable to add the above-mentioned boron compounds to the liquid silicon compound prior to commencing the pyrolytic precipitation process.

For a known content of phosphorus compounds in the liquid silicon compounds, the phosphorous being present, for example, in form of phosphorus tri-chloride $PCl_3$ and/or phosphorus oxychloride $POCl_3$, it is preferable to use the above-mentioned boron compounds in such a quantity that the atomic ratio of boron in the boron compound to the total phosphorus content, determined for example by analysis, is smaller than 100 and is preferably approximately equal to 1. When the phosphorus content is smaller than $10^{-6}$ g. P/g. Si, the quantity of boron added is preferably such that the ratio by weight of the total boron content to the silicon content of the compound is less than $10^{-4}$. Only when this quantitative ratio is considerably exceeded is the precipitated silicon so highly p-doped that the boron content cannot be essentially reduced by subsequent zone-melting.

For example, if a p-type silcon rod with a specific resistance of 100 ohm cm. is to be produced, the amount of boron in the completed silicon rod whose doping action is not compensated by the phosphorus being present, is equal to:

$$9 \cdot 10^{-10} \text{ g. B/g. Si}$$

this corresponds to:

$$8 \cdot 10^{-11} \text{ mole B/g. Si}$$

In general, about 25% of the boron contained in the finished rod can be compensated by the still-remaining phosphorus. This corresponds to a phosphorus content in the finished product of about $$2 \cdot 10^{-11} \text{ mole P/g. Si}$$

If, for example, the phosphorus content of the original rod has been determined by analysis as:

$$11.5 \cdot 10^{-9} \text{ g. P/g. Si}$$

corresponding to $$3.7 \cdot 10^{-10} \text{ mole P/g. Si}$$

then about 5 to 7 zone-melting passes must be performed with the finished rod in order to reduce the phosphorus content to the value of $2 \cdot 10^{-11}$ mole P/g. Si, if no boron tri-halide according to the invention is added. The residual phosphorus in the rod, together with the boron contained in the finished rod, results in a specific resistance of approximately 100 ohm cm.

When, according to the invention, boron chloride, bromide or iodide, in a ratio of B:P=1:1, is added, the equivalent quantity of the boron compound, for example boron tri-chloride $BCl_3$, which would bond the entire amount of phosphorus, would be $$3.7 \cdot 10^{-10} \text{ mole } BCl_3/g. \text{ Si}$$

Then, in theory, the finished product would have the desired specific resistance without requiring further purification by zone-melting. However, when silicon is being precipitated in polycrystalline form, it is desirable to subject it to at least one zone-melting pass for converting the polycrystalline silicon into a monocrystal. Furthermore, for improving the quality of the crystal, 2 to 4 zone-melting passes are generally employed.

For this reason, the atomic ratio of boron to phosphorus may be made smaller than the unity value. For example, if the boron compound is added to the liquid silicon compounds in a quantity of $$3.55 \cdot 10^{-10} \text{ mole B/g. Si}$$

then $$0.15 \cdot 10^{-10} \text{ mole P/g. Si}$$

remain in the silicon-halogen liquid to be evaporated and for pyrolytic precipitation.

Due to the fact that approximately 25% of the silicon contained in the liquid silicon compound, as well as the entire amount of phosphorus contained in the liquid but is not compounded with added boron, is precipitated upon the carrier rod, the content of phosphorus which in the rod is not bonded by boron, amounts to $$0.6 \cdot 10^{-10} \text{ mole P/g. Si}$$

For eliminating this phosphorus content from the finished rod by a subsequent zone-melting process, only two zone passes are required. As mentioned, these passes are in any event desirable for obtaining perfect monocrystalline products.

As mentioned, the ratio of boron to phosphorus may also be chosen larger than the unity value, a ratio of up to 100 being applicable. An example of a process carried out according to the invention with a molar ratio of boron to phosphorus greater than 1 will be described presently. Commercially available silico-chloroform was found to contain boron and phosphorus in the following quantities:

$$2.4 \cdot 10^{-8} \text{ g. B/g. Si}$$
$$1.0 \cdot 10^{-6} \text{ g. P/g. Si}$$

The quantity of boron required for bonding this entire amount of phosphorus is:

$$35 \cdot 10^{-8} \text{ g. B/g. Si}$$

However, an excess of boron in an amount of $$50 \cdot 10^{-8} \text{ g. B/g. Si}$$

was used. Therefore, the quantity of boron employed for bonding the entire amount of phosphorus was $$32.6 \cdot 10^{-8} \text{ g. B/g. Si}$$

and the total quantity of boron added to the silico-chloroform was $$82.6 \cdot 10^{-8} \text{ g. B/g. Si}$$

After this quantity was added to the liquid silico-chloroform, the silico-chloroform was evaporated off the residue by passing hydrogen as carrier gas through the liquid. The resulting gaseous mixture was passed into the pyrolytic process. The resulting rod-shaped product exhibited p-type conductance and a specific resistance greater than 2000 ohm cm.

Obtaining this high resistance of the finished rod requires taking care that neither the carrier gas (hydrogen) nor the vessel wall and the gas conduits emit n-doping impurities.

An example of equipment suitable for performing the above-described method according to my invention is illustrated, partly in section, on the accompanying drawing.

Hydrogen, to serve as a carrier and reaction gas is supplied from a commercial cylinder 1 through a stop valve 2, a plural-stage pressure-reduction valve 3 and a gas-flow meter 4 to an evaporator 5. The evaporator vessel contains liquid silicon compound, for example silico-chloroform $SiHCl_3$ or silicon tetrachloride $SiCl_4$. Added to the liquid silicon-halogen compound is a boron halide, for example $BCl_3$ as described above. The evaporator 5 is essentially a cylindrical flask of material resistant to the silicon compound being used. The flask may consist of glass, suitable metals, or a shape-retaining synthetic material. The flask 5 is gas tightly sealed by means of a cover 6 which is traversed by a coaxially entering-supply pipe and is provided with a lateral outlet for a gas line 10. Shoved upon the lower portion of the gas supply pipe is an upwardly extended neck 7 of a float 8. The neck can glide vertically along the gas supply pipe so that the float 8 can move downwardly together with the liquid level as the liquid silicon compound is being progressively consumed. Two tapered nozzles 9 are joined with the neck of the float and are inclined toward the vertical axis so as to direct the issuing jets of hydrogen toward the surface of the liquid 8. The hydrogen gas flowing along the surface of the liquid continuously entrains the silico-chloroform vapor, thereby accelerating the evaporation. The hydrogen becomes mixed in the evaporator with the evaporated silico-chloroform and passes through the line 10 into the pyrolytic processing chamber through a nozzle 11 which produces a turbulent flow of gas. The gas thus passes along two carrier rods 13 of hyperpure silicon which are electrically connected at terminals 12 to a current source to be heated to pyrolytic, incandescent temperature (above 900° C.) by the electric current passing through the rods. The carrier rods 13 are mounted within a reaction vessel composed of an hermetically sealed quartz cylinder 14 and a metallic bottom structure 15. The upper ends of the rods are conductively connected with each other by a silicon bridge 16. The lower ends of the rods are stuck into bores of respective holders 17 consisting of spectral carbon which are fastened, for example by threaded screw engagement, to respective cylindrical metal sleeves 18 extending through the bottom structure 15 of the processing vessel. The sleeve 18 is conductively connected with the bottom structure 15 and with one of the current supply terminals 12. The other sleeve 18 is insulated from the bottom structure 15 by an insulating sleeve 19. While the rods 13 are being electrically heated in the above-described manner, the processing gas is supplied from the evaporator 5 through the gas line 10. The spent gases are discharged through an outlet conduit 20.

While reference is made above to a rod-shaped silicon carrier, the carriers may also have other shapes, such as that of discs or flat plates to be thickened by pyrolytic or epitaxial growth, and the carriers may be heated indirectly by heat conductance or radiation.

I claim:

1. The method of producing hyperpure silicon by pyrolytic precipitation from a gaseous silicon-halogen compound onto a solid, carrier body of silicon heated to incandescent temperature, which comprises employing a liquid silicon-halogen compound containing a trace of a phosphorus compound as an impurity and adding thereto to least one boron compound selected from the group consisting of boron chloride, boron bromide and boron iodide to form an admixture, evaporating the silicon compound virtually free from phosphorus off the admixture, and pyrolytically precipitating silicon from the evaporated silicon compound onto the heated silicon body.

2. The pyrolytic method of producing silicon according to claim 1, wherein said boron compound is selected from the group consisting of boron tri-chloride $BCl_3$, boron tri-bromide $BBr_3$ and boron tri-iodide $BI_3$.

3. The pyrolytic method according to claim 1, wherein the boron compound is admixed to the liquid silicon compound prior to commencing the pyrolytic precipitation of silicon.

4. The method of producing hyperpure silicon by pyrolytic precipitation from a gaseous silicon-halogen compound onto a solid, carrier body of silicon heated to incandescent temperature, which comprises employing a liquid silicon-halogen compound selected from the group consisting of silico-chloroform $SiHCl_3$ and silicon-tetrachloride $SiCl_4$, said silicon-halogen compound containing a trace of a phosphorus compound as an impurity, adding to said liquid silicon compound at least one boron compound selected from the group consisting of boron trichloride $BCl_3$, boron tri-bromide $BBr_3$ and boron triiodide $BI_3$, evaporating the silicon compound virtually free from phosphorus off a remaining residue, and pyrolytically precipitating silicon from the evaporated silicon compound onto the heated silicon body.

5. The method of producing hyperpure silicon by pyrolytic precipitation from a gaseous silicon-halogen compound onto a solid, carrier body of silicon heated to incandescent temperature, which comprises employing a liquid silicon-halogen compound which contains phosphorus compound as an impurity, adding to the liquid at least one boron compound selected from the group consisting of boron chloride, boron bromide and boron iodide, the atomic ratio of the boron content in the admixture to the total amount of phosphorus in the phosphorus compound being smaller than 100 to virtually eliminate phosphorus from the resulting gaseous silicon-halogen compound.

6. In the method according to claim 5, said boron-to-phosphorus ratio being approximately equal to the unity value.

7. The method of producing hyperpure silicon by pyrolytic precipitation from a gaseous silicon-halogen compound onto a solid, carrier body of silicon heated to incandescent temperature, which comprises employing a liquid silicon-halogen compound which contains phosphorus compound with a phosphorus content less than $10^{-6}$ gram phosphorus per gram of silicon contained in the silicon compound, adding to the liquid at least one boron compound selected from the group consisting of boron chloride, boron bromide and boron iodide, the quantity of boron in the boron compound being such that the atomic ratio of the total boron content to the silicon content of the liquid silicon compound is less than $10^{-4}$ to virtually eliminate phosphorus from the resulting gaseous silicon-halogen compound.

References Cited in the file of this patent

UNITED STATES PATENTS

| 2,981,605 | Rummel | Apr. 25, 1961 |
| 2,999,735 | Reuschel | Sept. 12, 1961 |

FOREIGN PATENTS

| 627,904 | Great Britain | Aug. 18, 1949 |